Feb. 15, 1949.  L. C. CURRIER  2,461,591
WHEEL BALANCING MACHINE
Filed April 17, 1947

Loren C. Currier
INVENTOR.

BY *Philip A. T. Terrell*
ATTORNEY.

Patented Feb. 15, 1949

2,461,591

UNITED STATES PATENT OFFICE 2,461,591

WHEEL BALANCING MACHINE

Loren C. Currier, Tulsa, Okla.

Application April 17, 1947, Serial No. 741,967

1 Claim. (Cl. 73—66)

The invention relates to wheel balancing machines of the type shown in my pending application, 734,251 filed March 12, 1947, and has for its object to provide an adjustable balance point, whereby the center of balance can be adjusted so that the balance point will be or can be placed in the same relation to the center of balance of the wheel when the wheel is turned upside down on the machine after the testing of the balance in the previous position of the wheel. Also allowing the adjusting of the balance point in relation to either side of the wheel to the most sensitive point.

A further object is to provide a balancing machine for wheels, which will automatically center the wheel when placed thereon, a single balancing point, and means for adjusting upwardly or downwardly the wheel supporting portion of the machine in relation to the balancing point and operable on the axis of the wheel.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
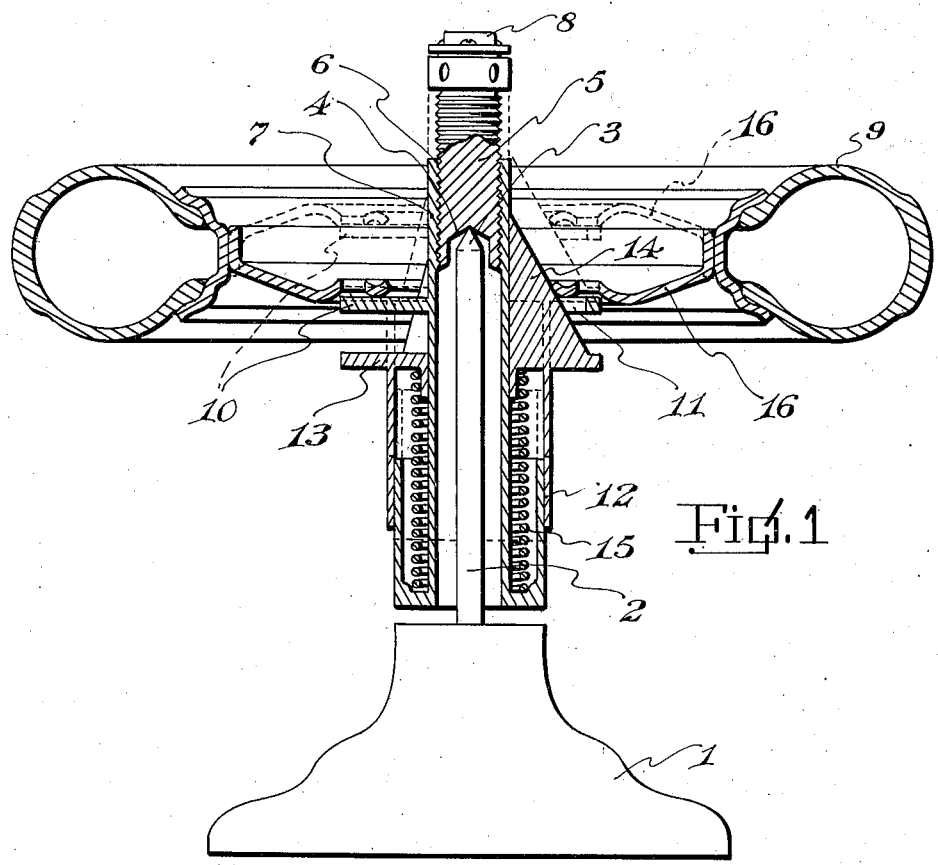
Figure 1 is a vertical transverse sectional view through the machine.

Referring to the drawing, the numeral 1 designates the base of the machine, adapted to rest on the floor, and 2 a vertical shaft terminating at its upper end in a pivot point 3 which engages in the conical recess 4 of the adjusting screw 5. The adjusting screw 5 is threaded at 6 into the upper end of the main body 7 and is provided on its upper end with a level 8 for indicating the balance of the wheel 9 so that proper weights can be applied to the wheel, to overcome any off balance.

The tubular body 7 is provided with an annular flange 10 having radial slots 11 therein, and slidably mounted on the lower end of the body 7, at 12, and on the body, is a member 13, provided with radial upwardly extending centering vanes 14, which extend through the radial slots 11, and normally forced upwardly by the expansion spring 15. When the disc wheel 16 is placed on the device, as shown in Figure 1, the weight of the wheel will overcome the expansive action of the spring 15 until the disc wheel rests on the flange 10, and during this movement the vanes 14 will center the wheel. It will be seen, that after the wheel is placed in position, all of the upper part of the machine is balanced on the pivot point 3 and the operator can test the balance by observing the spirit level 8.

It will be noted that the disc wheel 16 bulges outwardly towards the outside of the tire and wheel as a whole; in other words if the wheel is turned over from the full line position shown in Figure 1, to the dotted line position shown in Figure 1, the pivotal point 4 would be in a different relation to the center of balance of the wheel, therefore it will be seen that by adjusting upwardly or downwardly the screw 5, the entire structure along with the wheel, can be raised or lowered and the pivotal point adjusted in relation to the center of balance. It will also be seen that the pivotal point can be adjusted closer to the sides of the wheel for getting a better side balance.

Figure 2:
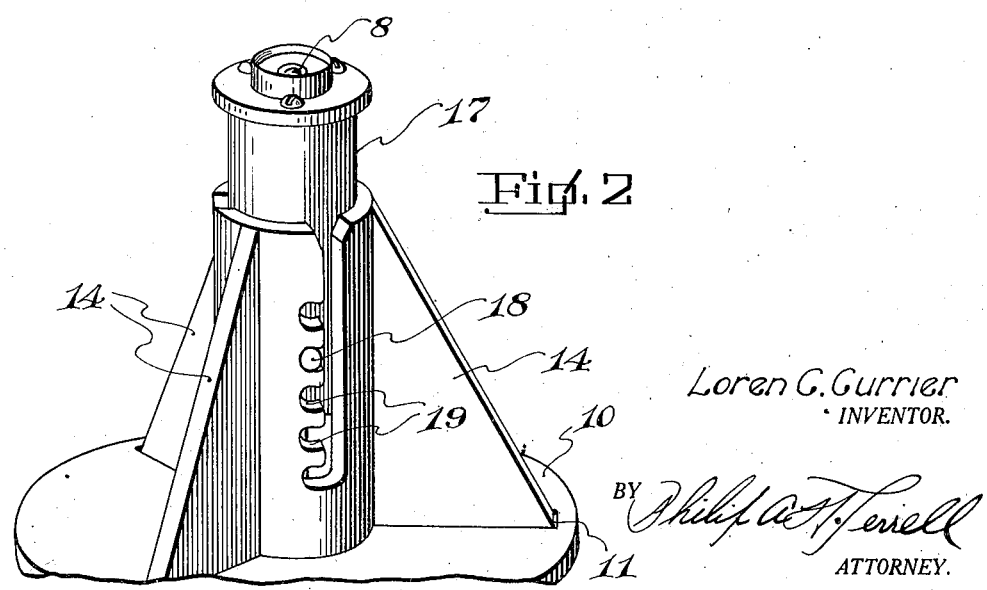
Figure 2 is a perspective view of a modified form of the adjusting part of the machine.

Referring to Figure 2, wherein a modified form is shown, instead of an adjusting screw 5, a rotatable member 17 is provided having a lug 18 adapted to be received in spaced notches 19. This modified form is for adjusting the pivotal point when the wheel, being tested, is reversed for testing both sides of the wheel.

From the above it will be seen that a wheel balancing machine is provided which has a balancing point which may be axially adjusted on the axis of the wheel, when the wheel is on the machine.

The invention having been set forth what is claimed as new and useful is:

The combination with a wheel balancing machine comprising a wheel support, said wheel support having an outer sleeve, an inner balance point sleeve within the first mentioned sleeve, said first mentioned sleeve having a vertical slot with spaced lugs, thereby forming spaced notches, said balance point sleeve having a lug adapted to be placed in any of said notches for varying the elevation of the balance point on the axis of a supported wheel.

LOREN C. CURRIER.

REFERENCES CITED

The following references are of record in the file of this patent:

UNITED STATES PATENTS

| Number | Name | Date |
|---|---|---|
| 1,729,947 | Lannen | Oct. 1, 1929 |
| 2,075,421 | Bennett | Mar. 30, 1937 |
| 2,170,848 | Bennett | Aug. 29, 1939 |
| 2,270,657 | Kraft | Jan. 20, 1942 |